Patented June 16, 1942

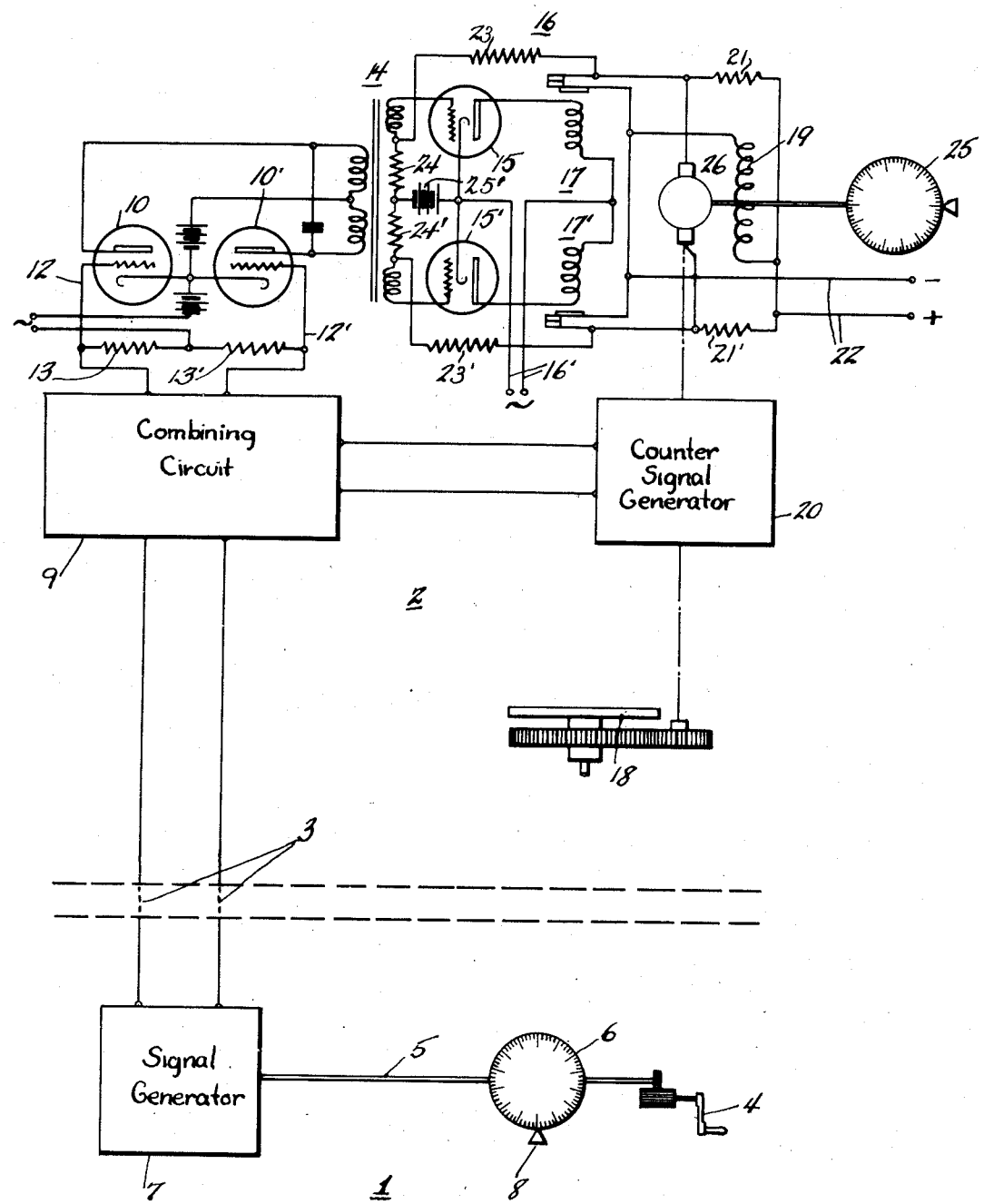

2,287,002

UNITED STATES PATENT OFFICE 2,287,002

ANTIHUNT POSITION CONTROL SYSTEM

Francis L. Moseley, Chevy Chase, Md., assignor to Sperry Gyroscope Company, Inc., Brooklyn, N. Y., a corporation of New York Original application June 6, 1936, Serial No. 83,844, now Patent No. 2,256,482, dated September 23, 1941. Divided and this application December 20, 1939, Serial No. 310,152

9 Claims. (Cl. 172—239)

This application is a division of U. S. Patent application, Serial No. 83,844, filed June 6, 1936, patented Sept. 23, 1941, No. 2,256,482, for Data transmission and control systems. The invention disclosed and claimed herein relates to improvements in the remote positional control of movable objects and, more particularly, to means for overcoming the tendency of a driven object because of its inertia to overshoot the position of synchronism or hunt about that position.

I have found that in a control system employing an electric motor to drive a controlled object improved following is attained and hunting prevented if the counter E. M. F. developed in the armature winding of the motor, or a portion thereof, is fed back to the input circuit controlling the operation of the motor and there combined with the primary signal proportional to the relative displacement of the controlled and controlling objects, due regard being paid to the relative phase or direction of the two potentials. Since the counter E. M. F. of a motor is proportional to the speed of rotation of its armature and hence to the speed of the object which it drives, the motor control term according to my invention comprises components proportional to relative displacement and to the speed of the controlled object.

One of the principal objects of the invention is to provide a dead beat positional control system.

Another object is to provide means for controlling the driving motor of such a system in accordance with the speed of the driven object to prevent overshooting or hunting.

A further object is to utilize the counter E. M. F. of the driving motor to improve the performance of the system.

Other objects and advantages of this invention will become apparent as the description proceeds.

In the drawing, a schematic wiring diagram of one embodiment of the invention is shown.

Reference numeral 1 designates the transmitter as a whole, whereas reference numeral 2 designates the receiver. Transmitter and receiver are connected by transmission line 3.

At the transmitter, handwheel 4 is shown geared to shaft 5 on which is mounted signal generator 7. The output of this generator is an electrical signal proportional to the angular position of shaft 5 which signal may be of any desired type suitable for transmission over line 3 as, for example, a signal of variable phase. The signal generator is shown as provided with a graduated data card 6, whose position is readable with the aid of index 8, which card furnishes an indication of the transmitted angular data, i. e., the angular position of shaft 5 and generator 7.

At the receiver, the signal after passing through a combining circuit 9, whose function will be described later, is applied to the grids of modulator tubes 10 and 10' connected in a balanced circuit. Tubes 10 and 10' are supplied from a suitable source with a low frequency voltage, such as a sixty cycle voltage, applied in the common branch of the two grid circuits. The signal output of the combining circuit produces a differential change of potential of the grids of modulator tubes 10 and 10' resulting in unbalancing the gains of these two tubes and causing the input 60 cycle voltage to be amplified more readily by one tube than by the other. A net 60 cycle voltage therefore reaches transformer 14 in the output circuit of these tubes which is reversible as to phase dependent on whether tube 10 or 10' supplies the greater output.

Transformer 14 passes this net 60 cycle voltage to the grids of relay operating tubes 15 and 15' of the motor control means 16 in 180° out of phase relation. Tubes 15 and 15' preferably amplify the signal applied to their input circuit. These tubes are supplied with an A. C. plate voltage from 60 cycle supply 16' and hence the net voltage passing through transformer 14 resulting from the turning of transmitter handwheel 4 causes one of the tubes 15 or 15' to energize the operating winding of one of the relays 17 or 17' whereby the contacts of such relay are caused to open, resulting in the rotation of the armature of direct current motor 26 in a manner to be more fully explained. Motor 26 rotates in the proper direction to move data card 25 on its shaft into synchronism with the corresponding card 6 at the transmitter, and where a ponderable controlled object such as rotatable platform 18 is driven from motor 26, such object is moved into synchronism with the controlling object at the receiver.

The repeat-back connection whereby countersignal generator 20 (similar to primary signal generator 7) is driven from motor 26 tends to cause the signal from generator 20 to become equal to that received over the line from generator 7, the two signals being opposed to one another in combining circuit 9. The output of generator 20 furnishes the repeat-back or countersignal which is of a character similar to that of the signal supplied by generator 7 and has a value proportional to the angular position of data card 25 and therefore of ponderable object 18. The opposition in the combining circuit of this countersignal to the signal received over the line results in a zero net signal when exact correspondence is established between the positions of the controlling object at the transmitter and the controlled object at the receiver. At such time no net difference of potential exists between the grids of tubes 10 and 10' and hence no 60 cycle voltage due to unbalance of these tubes is applied to tubes 15 and 15'. As the circuit is again balanced, energized relay 17 or 17' is deenergized and motor 26 stopped with the receiver indicating means 25 in correspondence with the corresponding transmitter means 6.

The operation of motor 26 will be apparent when it is noted that the motor field winding 19 is permanently connected across the D. C. supply leads 22 and that the positive lead 22 feeds two equal resistances 21 and 21' that are adapted to be connected through the normally closed contacts of relays 17 and 17' respectively to the negative supply lead 22, the respective left-hand terminals of the resistances 21 and 21' being permanently connected to opposite brushes of the armature of motor 26. Opening of either one or the other of the relays 17 or 17' causes a large unbalance in the currents flowing in resistances 21 and 21' and the net voltage resulting therefrom is supplied to the armature of motor 26 causing the latter to rotate in a direction corresponding to the direction of the voltage unbalance. Relays 17 and 17' in combination act as a reversing switch controlling the direction of operation of motor 26, this switch having an "off" or neutral position to stop the motor by deenergizing the armature and applying dynamic braking as will be further described.

When the countersignal generator reaches a position of synchronism with the transmitter signal generator, resulting in the deenergization of the energized relay 17 or 17' as the case may be, the contact of such relay closes so that the armature of motor 26 is short-circuited through the closed contacts of both relays 17 and 17' in a full strength field resulting in very strong dynamic braking and the almost immediate stoppage of the motor. In order to further insure against overshooting and hunting of motor 26 about the position of synchronous alignment resistors 23 and 23' are shown respectively connected to opposite brushes of motor 26 and are also connected to resistors 24 and 24' that are interposed between the two halves of the secondary winding of transformer 14. Changes in speed of motor 26 corresponding to acceleration and deceleration of this motor produce variations in the back E. M. F. of this motor, which variations are applied to the grids of tubes 15 and 15' by virtue of the potential drops in resistors 24 and 24' and thereby furnish a D. C. bias determining the operating condition of the tubes in addition to the bias furnished by grid battery 25', the connections being such that the voltage produced across the armature of motor 26 acts on tubes 15 and 15' in a direction to cut the plate current of the driving tube 15 or 15' as the case may be, to zero or reduce this current to a value which allows the operated relay to release before countersignal generator 20 and associated object 18 are fully restored to synchronism, whereby motor 26 is brought to rest in a dead beat manner and without overshooting or hunting. It will be further apparent that any tendency to pass the position of synchronism will be strongly opposed by a combination of the displacement and velocity signals.

My present invention is not concerned with the particular type of signal generated at the transmitting end, the manner in which the signal is transmitted over the line nor with the type of countersignal generated at the receiving end. Neither is it concerned with the manner in which the effects of the primary and countersignals are opposed to one another in a combining circuit. Well known means are available for generating and combining electrical signals and any means may be employed in connection with my invention which will produce a net difference in potential across the grids of motor control tubes 15 and 15' proportional to the angular displacement between the controlling and controlled objects.

As many changes could be made in the above construction and many apparently widely different embodiments of this invention could be made without departing from the scope thereof, it is intended that all matter contained in the above description or shown in the acompanying drawing shall be interpreted as illustrative and not in a limiting sense.

Having described my invention, what I claim and desire to secure by Letters Patent is:

1. In a positional control system, a controlling rotatable object, a controlled object rotatably positioned therefrom, a reversible motor for driving said controlled object, circuit means for controlling said motor including an electromagnetic reversing switch, electronic means for controlling the operation of said switch, means creating an electrical signal variable in accordance with the relative displacement of said objects for applying a primary signal to said electronic means, and means for applying a potential derived from the counter E. M. F. of said motor to said electronic means for causing dead-beat operation of the motor and controlled object.

2. In a positional control system, a controlling rotatable object, a controlled object rotatably positioned therefrom, a reversible motor for driving said controlled object, a pair of electron tubes connected in a balanced circuit, means for creating an electrical signal variable in accordance with the relative displacement of said objects and applying the same to the grids of said tubes, circuit means for controlling said motor including a reversing switch operated from the outputs of said tubes, and means for applying a portion of the counter E. M. F. generated by said motor also to the grids of said tubes to control the operation of said switch.

3. A positional control system comprising, a controlling object, a controlled object, a reversible motor for driving said controlled object, a pair of electron tubes connected in a balanced circuit, a reversing switch actuated by the outputs of said tubes for controlling said motor, means for generating and applying to the grids of said tubes an electric signal of reversible phase proportional to the positional disagreement of said controlling and controlled objects, and means for applying to said grids a second signal derived from the counter E. M. F. generated by said motor, said two signals being combined in a manner to prevent hunting of said motor and controlled object.

4. In a positional control system, a controlling rotatable object, a controlled object rotatably positioned therefrom, a reversible direct current motor driving said controlled object, a constantly excited field for said motor, a reversing switch having a neutral position controlling the operation of said motor, said switch in its neutral position short circuiting the armature winding of said motor to apply dynamic braking, means for creating an electrical signal variable in accordance with the relative displacement of said objects and applying the same to said switch, and means for applying thereto an additional potential derived from the counter E. M. F. of said motor, the operation of said switch in response to said two potentials and the application of dynamic braking jointly preventing hunting of said motor and controlled object.

5. A positional control system comprising a controlled object, means including a direct current motor for driving said object, a controlling object, means for obtaining an electric signal corresponding to the relative displacement of said two objects, means for controlling the operation of said motor in response to said signal to cause said controlled object to be driven to a position corresponding to that of said controlling object including a signal actuated device having electronic tubes therein, means for deriving from the circuit of said motor a continuous potential corresponding to the speed of the motor and circuit means for applying said potential as a bias to said tubes.

6. A positional control system comprising a controlled object, means including a direct current motor for driving said object, a controlling object, means for obtaining an electric signal corresponding to the relative displacement of said two objects, means for controlling the operation of said motor in response to said signal to cause said controlled object to be driven to a position corresponding to that of said controlling object including a signal actuated device having electronic tubes therein, and circuit means constituting a feed-back from the armature of said motor to a control element of at least one of said tubes for applying as a biasing potential to said control element a uni-directional potential derived from the E. M. F. generated by rotation of said armature, thereby to control the actuation of said device by said signal.

7. In a system for causing a controlled object to follow the changing position of a remote controlling object, means including a direct current motor for driving the controlled object, means for obtaining an alternating electric signal proportional to the positional disagreement of the two objects, a bias controlled electron tube amplifier receiving said signal, means utilizing the output of said amplifier for controlling the operation of said motor to cause the controlled object to be driven to a position corresponding to that of the controlling object, and a feed-back connection from the armature of said motor to a biasing circuit in said amplifier for supplying as a bias determining the output of said amplifier a continuous potential created by rotation of said armature.

8. A positional control system comprising a controlled object, and a controlling object, means including a direct current motor having a rotatable armature for driving said controlled object, said controlled object being driven by said means at a speed substantially directly proportional to the speed of rotation of said armature, electron tube means having a controlling element, means for applying jointly to said controlling element two E. M. F.'s, one of said E. M. F.'s being proportional to the positional disagreement of said two objects and the other of said E. M. F.'s being a fraction of the counter-E. M. F. generated by rotation of said armature, and means for controlling the operation of said motor in accordance with the output of said tube means.

9. A positional control system comprising a controlled object, a controlling object, means including a direct current motor for driving said controlled object, circuit means including grid controlled electron tubes connected to supply an output governing the operation of said motor, means for obtaining and applying to the grid circuit of said tubes an alternating voltage proportional to the positional disagreement of said two objects and circuit means providing a grid bias for said tubes in proportion to the voltage existing across the armature of said motor.

FRANCIS L. MOSELEY.